United States Patent [19]
Johnson

[11] Patent Number: 5,936,719
[45] Date of Patent: Aug. 10, 1999

[54] TEST UNIT AND METHOD FOR SIMULTANEOUS TESTING OF MULTIPLE OPTICAL FIBERS

[76] Inventor: Robert W. Johnson, 39 West Hill Rd., Brookline, N.H. 03033

[21] Appl. No.: 08/893,243

[22] Filed: Jul. 16, 1997

Related U.S. Application Data

[60] Provisional application No. 60/021,862, Jul. 16, 1996.
[51] Int. Cl.[6] .................................................. G01N 21/00
[52] U.S. Cl. .................. 356/73.1; 356/73.1; 359/110; 359/173
[58] Field of Search ........................... 356/73.1; 359/110, 359/173

[56] References Cited

U.S. PATENT DOCUMENTS 5,383,015  1/1995  Grimos ................................ 356/73.1
5,570,217  10/1996  Fleuron ............................... 356/73.1

Primary Examiner—Frank G. Font
Assistant Examiner—Reginald A. Ratliff
Attorney, Agent, or Firm—Larson & Taylor

[57] ABSTRACT

An apparatus and method for simultaneously testing a plurality of optical fibers, preferably using optical time domain reflectometry, wherein the apparatus includes a light source for providing a pulse of light, at least one splitter means positioned for receiving the pulse of light and for splitting the pulse of light into at least two substantially identical pulses of light, and a plurality of coupling means, each connected to one of the optical fibers under test and each positioned for receiving one of substantially identical pulses of light and directing that pulse of light into an optical fiber. In a preferred embodiment, the backscattered signals from the optical fibers are directed back through the coupling means to a plurality of receivers and data averagers.

20 Claims, 4 Drawing Sheets

TEST UNIT AND METHOD FOR SIMULTANEOUS TESTING OF MULTIPLE OPTICAL FIBERS

PRIORITY

This application claims priority based on provisional U.S. Pat. application. No. 60/021,862, filed Jul. 16, 1997.

BACKGROUND

1. Field of the Invention

The present invention relates to a fiber test system for testing optical fibers and, in particular, to a system for testing multiple fibers simultaneously for damage or degradation.

2. Prior Art

While fiber optics have been used for a number of years in the telecommunications industry, the deployment of fiber optic networks has escalated tremendously in recent years in the access networks of telephone companies and cable television companies. Because these optical fibers are often subject to stresses that can lead to breaks, degradation or misalignment of the fibers, which can be devastating to the access network, the telecommunications industry has, out of necessity, developed support systems for testing the optical fibers. These systems, commonly referred to as Remote Fiber Test Systems allow an operator at a central location to perform a test on a fiber or fibers within an optical fiber cable to determine if there is any degradation or damage to the monitored fiber. Field studies indicate that 85 to 90 percent of all cable problems can be located in this manner.

In general, these Remote Fiber Test Systems comprise a Test System Controller (TSC), which is located at a central location with an operator, and a plurality of Remote Test Units (RTUs) which are located in the field. A communications subsystem connects the RTUs to the TSC. The RTUs use the well developed principles of Optical Time Domain Reflectometry (OTDR) to acquire the loss profiles of the monitored fibers and these profiles are then communicated to the TSC for storage, analysis and display of the fiber characteristics.

A block diagram for a typical prior art RTU is shown in FIG. 1. The RTU of FIG. 1 is comprised of three major components; the communications and control module CCM, the OTDR module OTDR and an optical switch means OS for switching between each of a plurality of fibers under test. OTDR module OTDR is comprised of a laser L, a receiver R, a data averaging means DA and a coupler C.

In use, communications and control module CCM triggers laser L to send a stimulating pulse to the fiber under test (one of $FUT_1$ –$FUT_N$) through coupler C and optical switch means OS. The stimulated fiber then develops a time dependent Rayleigh Backscatter signal in response to the laser pulse which is returned to receiver R through optical switch means OS and coupler C. Receiver R converts the optical signals to electrical analog signals and samples these signals to convert them to digital signals. This sample and convert process continues until no further backscatter signals are detected. The process thus generates a set of data points wherein the value of each point describes the loss of an incremental segment of the stimulated fiber and the total set of values constitutes a single scan of the fiber. As each of these scans generates digital values, they are passed to the data averaging means DA where they are stored and summed with previously accumulated values. When a specified number of scans are completed, the accumulated values constitute the actual loss profile of the fiber. Once the loss profile of each fiber is acquired, it is available for analysis and/or transmission and another fiber may be tested.

One operational mode of the RTU that has been found to be particularly advantageous is a mode called "surveillance." In the surveillance mode, the RTU is programmed to automatically move switch means OS from fiber to fiber and to acquire a loss profile for each fiber. Each of the newly acquired profiles are examined or compared to the known good profile for the fiber in order to locate those fibers that are either deteriorating or have reached a failure point. When such a fiber is found, a message is sent from the RTU to the Test System Controller, thereby notifying the operator of the condition.

There are at least two major drawbacks to the large scale deployment of these typical RTUs in an extensive access fiber network; the high cost of the RTUs and the relatively slow speed at which the loss profiles are acquired. Further, the use of a mechanical switch means in these typical RTUs causes inherent unreliability. The present invention overcomes these drawbacks by providing significant cost reductions, increasing surveillance scan speed by at least a factor two over conventional systems and eliminating the need for a mechanical switch means.

SUMMARY OF THE INVENTION

To achieve the cost reductions and the increased speed, the present invention provides for testing multiple fibers simultaneously instead of sequentially, as in the prior art systems described above. This simultaneous testing is achieved through the use of one or more optical beam splitters which split the output pulses of a single laser such that the pulses are directed to a plurality of fibers through a plurality of associated couplers. The Rayleigh Backscatter signals from each fiber are then passed back through the associated coupler to an associated detector/receiver circuit where they are converted to digital values. The values are then sent to a value averaging circuit to be accumulated in the conventional manner, thereby providing the loss profile for each fiber. While the invention is described below in terms of a remote test unit (RTU), the invention can also be advantageously used as an on-site or portable test unit, such as would be used by installers of access fiber optic networks.

The maximum number of fibers that can be tested with a single test unit or remote test unit (RTU) of the present invention depends on the maximum total loss of the fibers under test and the power of the laser pulse source. In one preferred embodiment, a single laser pulse source provides identical stimulus pulses to four separate fibers simultaneously by having the laser pulse pass through a single beam splitter and then through two parallel beam splitters. The two outputs from each of the parallel beam splitters are then passed to four individual couplers which are associated with individual fibers under test.

Alternatively, in order to decrease cost further, the backscatter signals from the plurality of fibers under test may be simultaneously directed to a single receiver. While a single receiver is not capable of determining the complete loss profile of individual fibers, tests show that a single receiver is capable of detecting drastic changes in the fibers, such as catastrophic cable cuts. The detection of a change is accomplished through a set of algorithms that operate on the acquired composite loss data set. These algorithms first perform an autocorrelation analysis on the loss profile data set. From this analysis, what amounts to a table of "features" is generated. The features are given as the distances to, and descriptions of, major anomalies in the loss profile, such as reflections and reductions in the Rayleigh Backscatter. This table is then compared to a table derived at an earlier time and held as a reference. If there is any deviation in the comparison of the features between the two tables, a probable failure is indicated. In most cases, it is possible to determine which fiber under test is effected.

In another preferred embodiment, each coupler of the RTU is replaced with a relatively new type of device which is capable of selectively functioning as a switch, a light shutter, or a coupler. By directing all the backscattered signals to a single receiver and setting the devices to function as couplers, the RTU performs the catastrophic surveillance described above. Once a problem is detected in a fiber using the algorithms described earlier for composite data set analysis, all the devices associated with the other fibers under test are set to the light shutter or "off" position such that only the backscatter signals from the problem fiber are sent to the receiver. Thus, the complete loss profile for that fiber can be determined.

Other objects, features, and advantages of the present invention will be set forth in, or will become apparent from, the detailed descriptions of the preferred embodiments of the invention which follow.

DETAILED DESCRIPTION OF THE PREFERRED EMBODIMENTS

Figure 1:
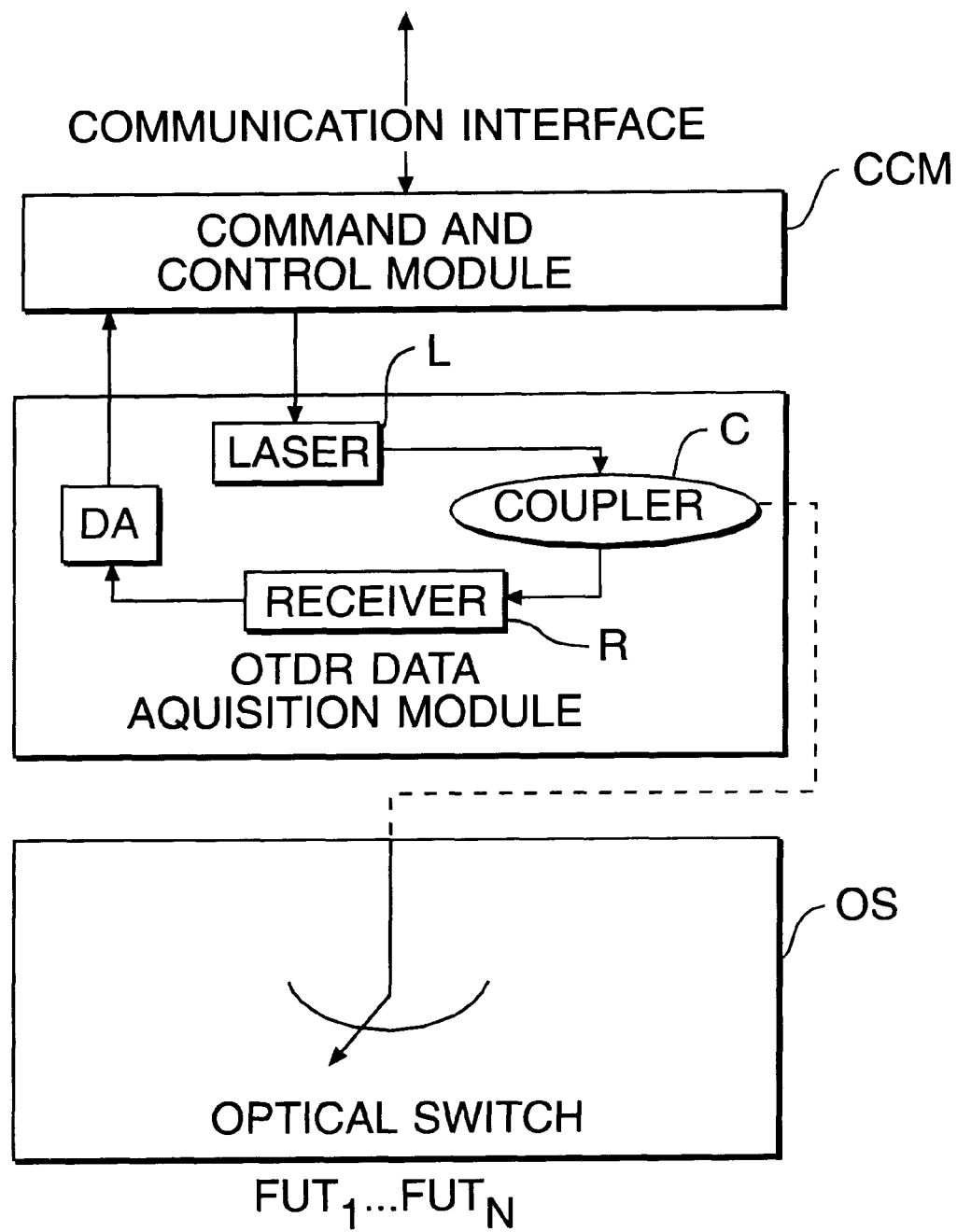
FIG. 1 is a block diagram of a Remote Test Unit of the type used in the prior art, as described in the Background section above.
Figure 2:
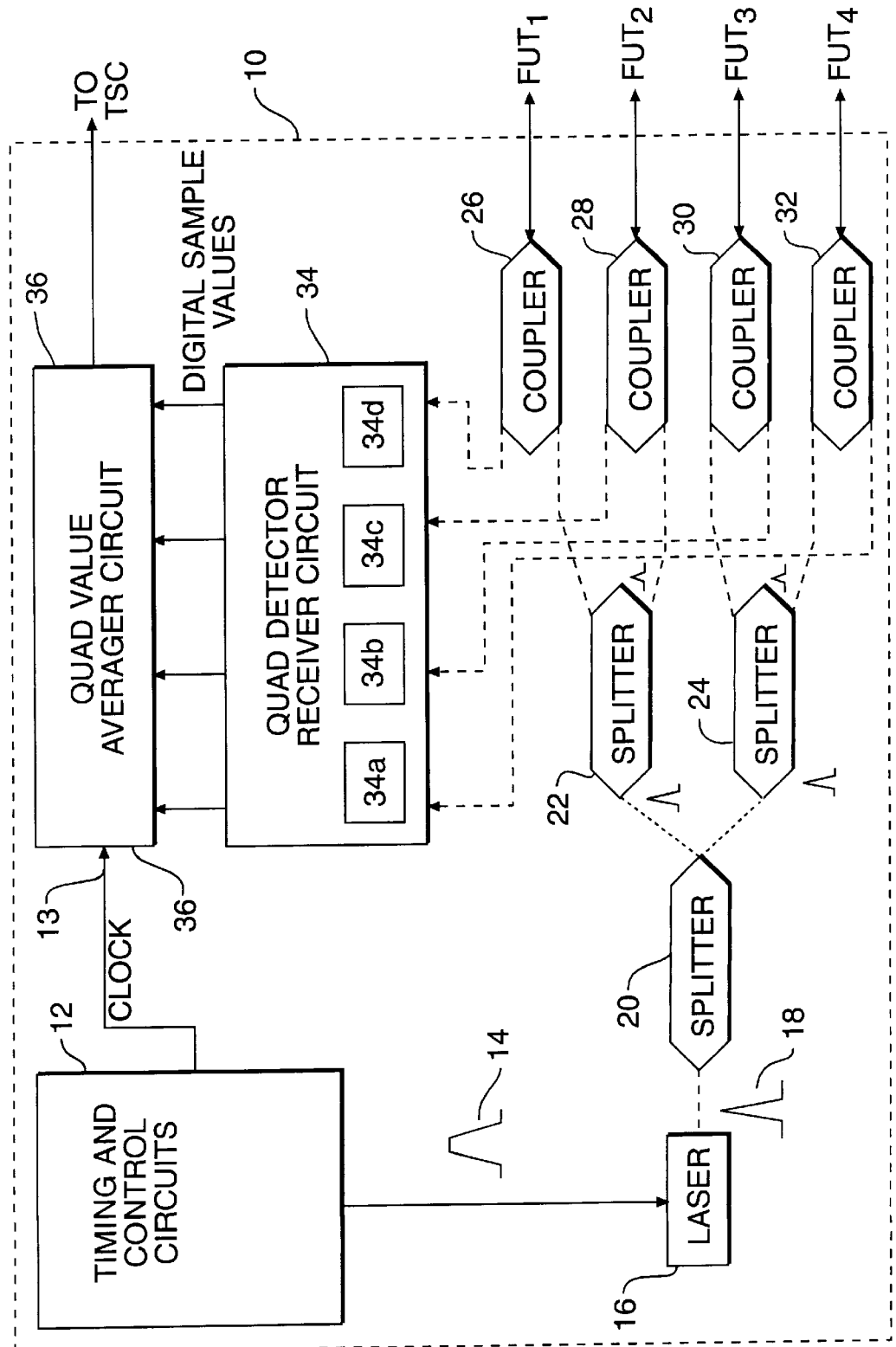
FIG. 2 is a block diagram of a preferred embodiment of a Remote Test Unit of the present invention using multiple receivers.

With reference now to the drawings in which like numerals represent like elements throughout the several views, a block diagram of a preferred embodiment of the Remote Test Unit of the present invention is shown in FIG. 2. Remote Test Unit 10 comprises a timing and control circuit 12, a laser 16, optical beam splitters 20, 22 and 24, couplers 26, 28, 30, and 32, a quad detector/receiver 34, comprising receivers 34a–34d, and a quad value averaging circuit 36.

In operation, timing and control circuit 12 stimulates laser 16 with drive pulse 14 causing laser 16 to provide an optical pulse 18 (adjustable in pulse width from 10 ns to 10 msec) to splitter 20, which produces two identical pulses. The pulses from splitter 20 are again split by splitters 22 and 24 such that four identical pulses are produced, each approximately 6 db less than the level of the original source optical pulse 18. Each of these four pulses is then fed to an associated one of couplers 26, 28, 30, and 32 and is then passed to one of the fibers under test (FUT$_1$ through FUT$_4$). At this point, each of the four pulses is approximately 9 db less than the level of the original source optical pulse 18.

The backscattered signal from each of the four fibers under test is reflected back through the associated one of couplers 26, 28, 30, and 32 and is sent on to an associated one of receivers 34a–34d of quad detector/receiver 34. Receivers 34a–34d receive the backscattered signals and pass them to the quad value averaging circuit 36 which samples and converts the analog signals to digital values. The conversion process is performed synchronously with the convert clock signal 13 which is initiated simultaneously with drive pulse 14. In a manner similar to that of the prior art, a total set of values is produced constituting a single scan for each of the four fibers under test.

Once the loss profiles of the four fibers have been acquired, they are available for analysis and/or transmission to the Test System Controller (TSC). Because the values for the four fibers under test are acquired and processed simultaneously, the process is four times faster than the prior art technique of testing each of the four fibers sequentially.

While this embodiment of the present invention increases loss acquisition speed by a factor of four, the design is still relatively costly because multiple receivers are required, even though only a single laser source is required. Due to this cost, fiber network construction would likely be the primary use for such a system. Full time surveillance applications require a more cost effective solution.

Figure 3:
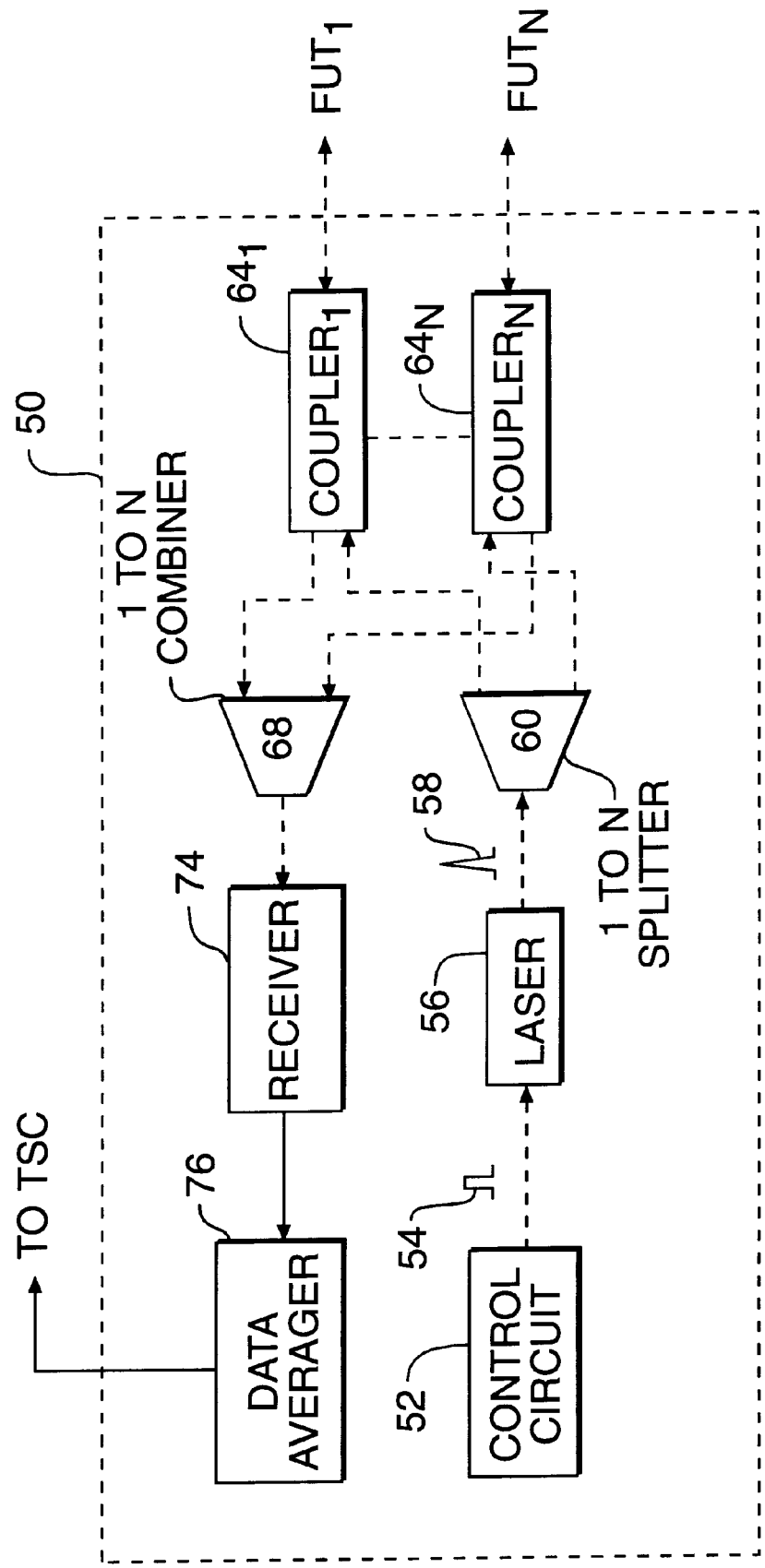
FIG. 3 is a block diagram of a preferred embodiment of a Remote Test Unit of the present invention using a single receiver.

A more cost effective solution is disclosed in FIG. 3, which is a block diagram of a preferred embodiment of a Remote Test Unit of the present invention using a single receiver. RTU 50 comprises a control circuit 52 which sends a drive pulse 54 to laser 56 causing laser 56 to provide an optical pulse 58, in much the same manner described with respect to the embodiment of FIG. 2. Splitter means 60 takes the single input from laser 56 and splits it into N number (any even number) of output pulses. Splitter means 60 works on the same principle as the combination of splitters 20, 22, and 24 in the embodiment of FIG. 2. As stated above, the strength of the pulse signals decrease the more they are split, so the practical limit of N is determined by the power of the laser 56 and the maximum total loss of the fibers under test.

The signals from splitter means 60 are passed through N individual couplers, represented by couplers $64_1$ through $64_N$, into N fibers under test (FUT$_1$ through FUT$_N$). Again, the backscattered signals are reflected back through couplers 64, through $64_N$ and combiner means 68 into a single receiver 74. Thus, receiver 74 receives a composite input of all the Rayleigh Backscatter signals from the fibers under test. Tests indicate that through analysis, receiver 74 can easily recognize the ends of up to eight fibers under test. This is accomplished with an algorithm that first analyzes the composite loss profile through autocorrelation to detect all major anomalies. The algorithm then compares the locations of the anomalies to those acquired at an earlier time from a reference measurement. A change in the "signature" of the composite trace comparison indicates a major change and in most cases, which fiber under test has deviated. However, it is very difficult, if not impossible, to determine the detailed loss profile of the individual fibers from the composite data set. The RTU of this embodiment can only detect drastic changes in the end characteristics of the fibers, such as that caused by a catastrophic cable cut. It is usually not capable of determining the location of a fault or detecting subtle changes in loss characteristics.

Thus, the embodiment of the present invention shown in FIG. 3 has a lower cost per monitored fiber than the embodiment shown in FIG. 2, while still retaining the acquisition speed obtained from simultaneous testing of multiple fibers. However, with this embodiment, it is not possible to acquire high definition loss profiles for specific fibers.

Figure 4:
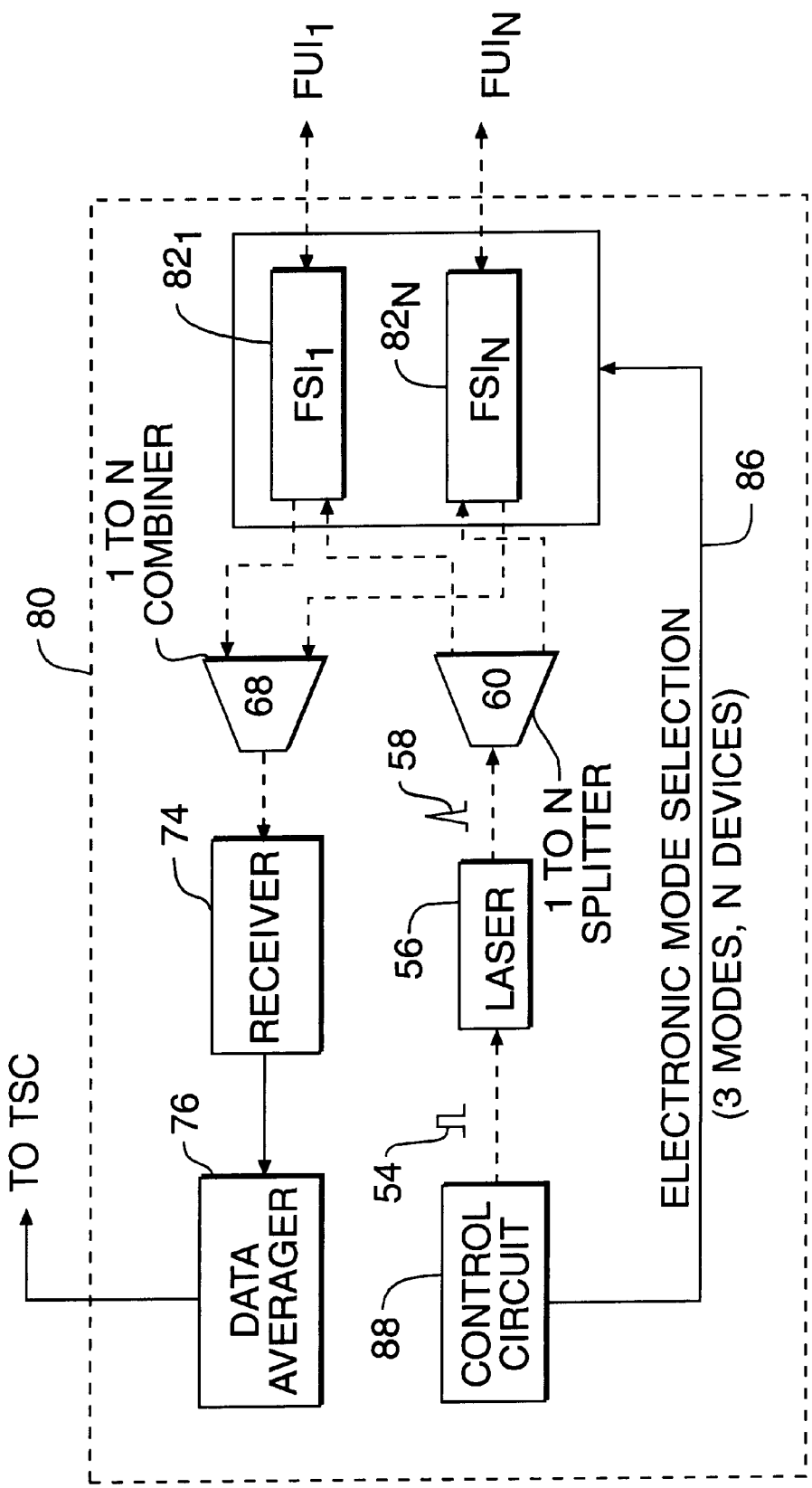
FIG. 4 is a block diagram of a preferred embodiment of a Remote Test Unit of the present invention using multiple receivers and configurable switches.

An alternate preferred embodiment of the present invention is shown in FIG. 4. This embodiment combines the benefits of high definition from the embodiment of FIG. 2 with the lower cost of the embodiment of FIG. 3. These benefits are combined through the use of a new type of switching device available from Fiber Switch Inc. of Hopewell, New York which is referred to below as a "configurable-coupler". This configurable-coupler is described in U.S. Pat. No. 4,917,452, to Liebowitz, which is herein incorporated by reference. This configurable-coupler uses a combination of prisms, fixed polarizing materials and liquid crystal polarizers that allow the light path and splitting ratios to be configured dynamically through the application of electrical control signals. Therefore, the configurable-coupler can selectively function as a single-pole double-throw switch, a light shutter (i.e., an "on" and "off" position) or a coupler, by simply applying the correct electrical contorts signals.

FIG. 4 shows the embodiment of the present invention using configurable-couplers in place of the couplers in FIG. 3. RTU 80 comprises the same elements as RTU 50 in FIG. 3 except that the N configurable-couplers, represented by configurable-couplers $82_1$ through $82_N$, are controlled with electronic mode selection signals 86 from control circuit 88. In the surveillance mode, all N configurable-couplers are controlled to operate as couplers, and thus, RTU 80 operates as RTU 50 of FIG. 3 to perform catastrophic failure detection. If a major fault is detected, the system determines in which fiber a problem is indicated. Control circuit 88 then applies electronic mode control signals 86 to configurable-couplers $82_1$ through $82_N$ so that all configurable-couplers are set to the shutter or "off" position, except for the configurable-coupler associated with the problem fiber. Thus, RTU 80 can then acquire a detailed loss profile on the fiber of interest because receiver 74 will only receive Rayleigh Backscatter signals from this one fiber. After the loss profile acquisition for this fiber is complete, control circuit 88 then sets all the configurable-couplers $82_1$ through $82_N$ to the coupler configuration again, so the surveillance operation may continue.

Although the invention has been described in detail with respect to preferred embodiments thereof, it will be apparent to those skilled in the art that variations and modifications can be effected in these embodiments without departing from the spirit and scope of the invention.

I claim:

1. Apparatus for testing a plurality of optical fibers comprising:
   a light source for providing a pulse of light;
   at least one splitter means positioned for receiving said pulse of light and for splitting said pulse of light into at least two substantially identical pulses of light; and
   a plurality of coupling means, each connected to one of said plurality of optical fibers under test for receiving one of said at least two substantially identical pulses of light and for directing said one of said at least two substantially identical pulses of light into said one of said plurality of optical fibers under test.

2. Apparatus as in claim 1, further comprising a combining means connected to each of said plurality of coupling means for combining backscattered signals received from each of said plurality of optical fibers under test and for providing an output thereof.

3. Apparatus as in claim 2, further comprising a receiver for receiving said output of said combining means.

4. Apparatus as in claim 3, further comprising a data averaging means connected to said receiver for sampling said received output of said combining means and converting said output to digital format.

5. Apparatus as in claim 1, further comprising a plurality of receivers, each connected to one of said plurality of coupling means, for receiving backscattered signals from one of said plurality of optical fibers under test.

6. Apparatus as in claim 5, further comprising a plurality of data averaging means, each connected to one of said plurality of receivers for sampling said received backscattered signals from one of said plurality of optical fibers under test and converting said signals to digital format.

7. Apparatus as in claim 1, wherein each of said plurality of coupling means comprises a configurable-coupler which is controllable to operate as a coupler or a light shutter.

8. A method for testing a plurality of optical fibers comprising:
   providing a pulse of light with a light source;
   splitting said pulse of light into at least two substantially identical pulses of light; and
   directing one of said at least two substantially identical pulses of light into each of said plurality of optical fibers under test using a coupling means connected to each of said plurality of optical fibers.

9. A method as in claim 8, further comprising combining backscattered signals from each of said plurality of optical fibers with a combining means and providing an output from said combining means of combined backscattered signals.

10. A method as in claim 9, further comprising receiving said combined backscattered signals from said combining means with a receiver and providing an output from said receiver.

11. A method as in claim 10, further comprising sampling said output from said receiver and converting said output to digital format with a data averaging means.

12. A method as in claim 8, further comprising using a plurality of receivers, each one of said plurality of receivers for receiving backscattered signals from one of said optical fibers under test.

13. A method as in claim 12, further comprising using a plurality of data averaging means, each said data averaging means connected to one of said plurality of receivers, for sampling said received backscattered signals from said one of said optical fibers under test.

14. A method as in claim 8, wherein each of said plurality of coupling means comprises a configurable-coupler controllable to operate as a coupler or a light shutter.

15. A method as in claim 14, further comprising a first mode wherein each of said configurable-couplers is controlled to operate as a coupler and a second mode wherein one of said configurable-couplers is controlled to operate as a coupler and the remaining ones of said configurable-couplers are controlled to operate as light shutters.

16. A method as in claim 14, wherein each of said configurable-couplers controlled to operate as light shutters is further controlled to be set to the "off" position so that no light is passed through said configurable-couplers.

17. An apparatus as in claim 7, further comprising a control means for controlling each of said configurable-couplers.

18. An apparatus as in claim 1, wherein said splitter means comprises one optical splitter positioned for splitting said pulse of light into two substantially identical pulses of light.

19. An apparatus as in claim 1, wherein said splitter means comprises three optical splitters positioned for splitting said pulse of light into four substantially identical pulses of light.

20. An apparatus as in claim 1, wherein said light source is a laser light source.

* * * * *